United States Patent Office 3,506,708
Patented Apr. 14, 1970

3,506,708
PRODUCTION OF ACROLEIN AND ACRYLIC ACID
William John Ball, Capel, near Dorking, and Rowland Harris Jenkins, Woodcote Green, Epsom, England, assignors to The Distillers Company Limited, Edinburgh, Scotland, a British company
No Drawing. Filed Mar. 9, 1966, Ser. No. 532,889
Claims priority, application Great Britain, Mar. 27, 1965, 13,105/65, Patent 1,070,354
Int. Cl. C07c 51/32
U.S. Cl. 260—533                                13 Claims

ABSTRACT OF THE DISCLOSURE

Improved yields of acrylic acid and acrolein are obtained in a process for treating propylene and molecular oxygen in the presence of an oxide composition containing antimony and vanadium and optional polyvalent metals as a catalyst by keeping the linear velocity of the reaction mixture at greater than two feet per second and the inlet pressure of the gas at at least 10 p.s.i.g.

---

The present invention relates to the production of acrolein and acrylic acid.

Processes for the production of acrylic acid by oxidation of acrolein or compounds giving rise to acrolein under the reaction conditions, e.g. propylene, with molecular oxygen in the vapour phase at elevated temperature over an oxide composition containing antimony and vanadium are known.

Accordingly the present invention is a process for the production of acrylic acid and by-product acrolein which comprises passing a gaseous reaction mixture containing propylene and molecular oxygen at an elevated temperature over an oxide composition containing antimony and vanadium as catalyst in a fixed bed reactor in which the linear velocity of the gaseous reaction mixture is greater than 2 feet per second and at the inlet of which the gas pressure is at least 10 p.s.i.g.

The oxide composition catalysts contain antimony and vanadium and may contain one or more additional polyvalent metals, for example tin, titanium, chromium, manganese, iron, cobalt, nickel, copper, zinc, molybdenum, cadmium, tungsten or thorium. Preferred catalysts contain antimony, vanadium, iron and tin or antimony, vanadium, copper and tin. The proportions of the various components of the oxide composition catalyst may vary within moderately wide limits. Suitably the composition contains an excess of antimony over any other single component and preferably an atomic ratio of antimony and vanadium within the range 1.8:1 to 4:1 or more especially between 2.5:1 and 3.5:1. When a polyvalent metal is present in the composition it is preferred to have an atomic ratio of vanadium to polyvalent metal within the range 1:0.25 to 1:2. The catalysts are preferably heated before use to a temperature within the range 550 to 1000° C. in a molecular oxygen containing gas.

The proportion of propylene in the reaction mixture may vary within fairly wide limits, for example between 1 and 20% by volume of the mixture, and suitably between 2 and 10% by volume.

The concentration of oxygen in the mixture may also vary within moderately wide limits, for example between 1 and 20% by volume and preferably between 2 and 15% by volume. The oxygen may be diluted with inert gases, and may be, for example supplied as air.

It is preferred to carry out the reaction in the presence of a gas which is substantially inert under the conditions of reaction, for example nitrogen, propane, butane, isobutane, carbon dioxide and/or steam. It is preferred to use steam or nitrogen or mixtures thereof. The concentration of the steam may vary within wide limits, for example between 10 and 60% by volume of the feed.

The reaction is carried out at an elevated temperature, for instance between 250° and 550° C. and preferably between 300 and 500° C. The contact time calculated from the gas flow at N.T.P. may be for example, in the range ½ to 10 seconds and preferably between 1 and 5 seconds.

The linear velocity of the gaseous reaction mixture must be greater than 2 feet per second and is preferably in the range 2.5 to 6. By linear gas velocity is meant the total flow of gaseous reactants (corrected to normal temperature and pressure and expressed in cubic feet/second) divided by the cross section of the reactor tube expressed in square feet.

The pressure at the reactor inlet must be at least 10 p.s.i.g. and may be for example in the range 20 to 50 p.s.i.g.

It has been found that operation of the process in accordance with the present invention, results in increased yields of acrylic acid and smaller amounts of by-products.

EXAMPLE 1

Powdered tin (95 parts by weight) was added during 20 minutes to a stirred suspension of commercial antimony trioxide (257 parts by weight) in a mixture of concentrated 70% nitric acid (566 parts by weight) and water (1600 parts by weight) at 95 to 100° C.; the mixture stirred for 10 minutes, cooled to 40° C. and filtered. The filter cake was suspended in a solution of ferric nitrate nonahydrate (162 parts by weight) in water (1800 parts by weight) at 60° C. and the mixture neutralised to pH 7 by addition of aqueous ammonia. The mixture was filtered and the solid washed once by resuspension for 15 minutes in water (2000 parts by weight), and filtered. The cake was mixed in a drum mixer with water (100 parts by weight) and commercial vanadium pentoxide (72.8 parts by weight) for 1 hour, filtered and dried at 110° for 16 hours. The cake was broken down to pass 30 mesh, mixed with 1% graphite, pelleted and heated in air in a muffle furnace. The furnace temperature was programmed from 200° to 850° C. at 22°/hour and maintained at 850° for 16 hours.

A gaseous feed of 7% propylene, 63% air and 30% steam was passed over this catalyst in a stainless steel reactor at 370° C. and a nominal contact time (at N.T.P.) of 3 seconds. The effect of linear velocity of the gaseous feed mixture and pressure on the yields of acrylic acid is shown in the following table.

| Gas velocity, ft./sec. | Pressure, p.s.i.g. | | Yields on propylene fed, percent | | |
|---|---|---|---|---|---|
| | Inlet | Exit | Acrylic acid | Acrolein | Carbon oxides |
| ¹ 0.6 | 0.2 | Nil | 20 | 39 | 8 |
| 4.5 | 12.0 | 7.3 | 26 | 44 | 13 |

¹ Comparison test.

EXAMPLE 2

The catalyst was prepared, pelleted and heat treated as described in Example 1 but had a nominal atomic ratio Sn:Sb:V:Fe≡1:3:1:0.5. A gaseous feed of 7% propylene, 63% air and 30% steam was passed over this catalyst at a contact time (at N.T.P.) of 3 seconds and 11.6 p.s.i.g.

pressure. The effect of linear gas velocity on the reaction is shown in the following table:

composition is heated before use within the range 550 to 1100° C. in a molecular oxygen containing gas.

| | Linear gas velocity, ft./sec. | Salt bath temp., °C. | Peak catalyst temp., °C. | Yields on propylene fed, percent | | | |
|---|---|---|---|---|---|---|---|
| | | | | Acrylic acid | Acrolein | Carbon oxides | Recovered propane |
| Reactor dimensions: | | | | | | | |
| 10′ x 1″ | 3.3 | 382 | 418 | 20.5 | 39.4 | 10.3 | 25.4 |
| 20′ x 1″ | ¹ 0.6 | 375 | 439 | 14.7 | 30.8 | 7.5 | 45.4 |

¹ Comparison test.

EXAMPLE 3

The catalyst was prepared, pelleted and heat treated as described in Example 1 with an atomic ratio $$Sn:Sb:V:Fe \equiv 1:4:1:0.25$$

A gaseous feed of 7% propylene, 63% air, and 30% steam was passed over the catalyst in a 10′ x 1″ reactor at 3 seconds contact time (at N.T.P.). The effect of inlet pressure on the reaction is illustrated by the following table:

| Inlet pressure, mm./Hg (gauge) | Salt bath temp., °C. | Peak catalyst temp., °C. | Yields on propylene fed, percent | | | |
|---|---|---|---|---|---|---|
| | | | Acrylic acid | Acrolein | Carbon oxides | Recovered propene |
| 600 | 425 | 457 | 16.0 | 30.9 | 11.5 | 36.9 |
| 800 | 414 | 454 | 17.5 | 33.6 | 12.8 | 33.7 |
| 1,000 | 410 | 452 | 18.3 | 33.4 | 13.8 | 32.0 |

We claim:
1. A process for the production of acrylic acid and acrolein which comprises passing a gaseous reaction mixture containing propylene and molecular oxygen at an elevated temperature over an oxide composition consisting essentially of antimony, vanadium, tin, oxygen and iron or copper as catalyst contained in a tubular fixed bed reactor in which the linear velocity of the gaseous reaction mixture is from about 2 feet per second to about 6 feet per second and at the inlet of which the gas pressure is at least 10 p.s.i.g.

2. A process as claimed in claim 1 wherein the inlet pressure is in the range 20 to 50 p.s.i.g.

3. A process as claimed in claim 1 wherein the oxide composition consists essentially of oxygen, antimony, vanadium, iron and tin.

4. A process as claimed in claim 1 wherein the oxide composition contains antimony, vanadium, copper and tin.

5. A process as claimed in claim 1 wherein the atomic ratio of antimony to vanadium in the oxide composition is within the range 1.8:1 to 4:1.

6. A process as claimed in claim 1 wherein the atomic ratio is between 2.5:1 and 3.5:1.

7. A process as claimed in claim 1 wherein the oxide

8. A process as claimed in claim 1 wherein the concentration of propylene in the reactant feed is between 1 and 20% by volume.

9. A process as claimed in claim 1 wherein the concentration of oxygen in the reactant feed is between 1 and 20% by volume.

10. A process as claimed in claim 1 wherein the reaction is carried out in the presence of a diluent selected from the group consisting of nitrogen, propane, butane, isobutane, carbon dioxide or steam or mixtures thereof.

11. A process as claimed in claim 10 wherein the diluent contains steam in proportion between 10 and 60% by volume.

12. A process as claimed in claim 1 carried out at a reaction temperature between 250 and 550° C.

13. A process as claimed in claim 1 carried out with cnotact times in the range ½ to 10 seconds.

References Cited

UNITED STATES PATENTS

| 3,403,177 | 9/1968 | Brown | 260—604 |
| 3,358,020 | 12/1967 | Hendrickx. | |
| 3,326,819 | 6/1967 | Newman | 260—604 |
| 3,313,856 | 4/1967 | Phielix et al. | 260—604 |
| 3,094,565 | 6/1963 | Bethell et al. | 260—604 |

FOREIGN PATENTS

| 978,520 | 12/1964 | Great Britain. |
| 979,543 | 1/1965 | Great Britain. |

LORRAINE A. WEINBERGER, Primary Examiner

D. E. STENZEL, Assistant Examiner

U.S. Cl. X.R.

252—472, 476; 260—604